(12) United States Patent
Yamashita (10) Patent No.: US 8,851,683 B2
(45) Date of Patent: Oct. 7, 2014

(54) LIGHT SOURCE DEVICE AND PROJECTION-TYPE DISPLAY DEVICE

(75) Inventor: Eisuke Yamashita, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 47 days.

(21) Appl. No.: 13/574,592

(22) PCT Filed: Mar. 10, 2010

(86) PCT No.: PCT/JP2010/053996
§ 371 (c)(1),
(2), (4) Date: Jul. 20, 2012

(87) PCT Pub. No.: WO2011/111186
PCT Pub. Date: Sep. 15, 2011

(65) Prior Publication Data
US 2012/0287408 A1    Nov. 15, 2012

(51) Int. Cl.
*G03B 21/16* (2006.01)
*F21V 29/02* (2006.01)

(52) U.S. Cl.
CPC ............... *F21V 29/02* (2013.01); *G03B 21/16* (2013.01)
USPC ................................ 353/57; 353/61; 362/264

(58) Field of Classification Search
USPC ............. 353/57, 58, 60, 61, 98, 119; 362/264
See application file for complete search history.

(56) References Cited

U.S. PATENT DOCUMENTS 7,513,626 B2 *   4/2009  Adachi et al. ................... 353/60
7,621,645 B2    11/2009  Nakagawa et al.
(Continued)

FOREIGN PATENT DOCUMENTS

| CN | 1670617 (A) | 9/2005 |
| CN | 1794084 (A) | 6/2006 |

(Continued)

OTHER PUBLICATIONS

International Search Report in PCT/JP2010/053996 dated Jun. 15, 2010 (English Translation Thereof).

(Continued)

*Primary Examiner* — William C Dowling
(74) *Attorney, Agent, or Firm* — McGinn IP Law Group, PLLC (57) ABSTRACT

Provided is a light source device capable of effectively cooling a bulb included therein. The light source device includes: a luminous tube having a bulb to seal a pair of electrodes that generates light by electric discharging; a reflector formed into a concave surface shape and configured to emit light from the bulb; and an air blowing device that generates a flow of gas to cool the luminous tube. The light source device includes: a first flow path for jetting out gas along the inner surface of the reflector to a first hemispherical part located far from the installation surface of the bulb; a second flow path for jetting out gas along the inner surface of the reflector to a second hemispherical part located near the installation surface of the bulb; and a movable plate for separating the first flow path and the second flow path from each other to form a part of each flow path, adjusts the amount of gas flowing into each flow path to adjust the ratio of the air flow in each flow path, and gradually narrows the flow path area in the flow path adjusted to increase the air flow in the gas jetting-out direction.

5 Claims, 8 Drawing Sheets

(56) References Cited

U.S. PATENT DOCUMENTS

| | | |
|---|---|---|
| 7,654,697 B2 | 2/2010 | Yoshimura et al. |
| 7,934,839 B2 | 5/2011 | Noda |
| 8,393,738 B2 * | 3/2013 | Lo et al. .................. 353/57 |
| 2003/0076683 A1 * | 4/2003 | Chang ...................... 362/294 |
| 2005/0162618 A1 * | 7/2005 | Morita et al. ............. 353/57 |
| 2007/0058373 A1 | 3/2007 | Yoshimura et al. |
| 2007/0279597 A1 | 12/2007 | Ochi |
| 2009/0051881 A1 | 2/2009 | Noda |
| 2010/0091252 A1 * | 4/2010 | Namba et al. ............. 353/61 |
| 2011/0051098 A1 * | 3/2011 | Kobayashi et al. ........ 353/61 |
| 2011/0216287 A1 * | 9/2011 | Kitamura et al. .......... 353/61 |
| 2011/0234993 A1 * | 9/2011 | Wada ......................... 353/61 |

FOREIGN PATENT DOCUMENTS

| | | |
|---|---|---|
| CN | 1904716 (A) | 1/2007 |
| CN | 101354523 | 1/2009 |
| CN | 101470335 (A) | 7/2009 |
| JP | 06-338212 A | 12/1994 |
| JP | 2002-298639 A | 10/2002 |
| JP | 2005-173085 A | 6/2005 |
| JP | 2006-243635 A | 9/2006 |
| JP | 2007-078736 A | 3/2007 |
| JP | 2007-157385 A | 6/2007 |
| JP | 2007-279110 A | 10/2007 |
| JP | 2007-280683 A | 10/2007 |
| JP | 2007/322823 A | 12/2007 |
| JP | 2008-310132 A | 12/2008 |
| JP | 2009-031608 A | 2/2009 |
| JP | 2009-99269 (A) | 5/2009 |
| JP | 2009-129590 A | 6/2009 |
| JP | 2009-198640 A | 9/2009 |

OTHER PUBLICATIONS

Chinese Office Action dated Apr. 29, 2014, with English translation.

* cited by examiner

LIGHT SOURCE DEVICE AND PROJECTION-TYPE DISPLAY DEVICE

TECHNICAL FIELD

The present invention relates to a light source device including an air flowing device for cooling a bulb that generates light by electric discharging, and a projection-type display device that includes the light source device.

BACKGROUND ART

For example, for the light source device included in the projection-type display device such as a projector, a lamp including a bulb that generates light by electric discharging may be used. The light source device of this type may have a structure for cooling the bulb because the bulb generates heat during the use of the lamp.

In the bulb, there is arranged a pair of electrodes that discharges electricity to generate light. When the pair of electrodes face each other with an angle in a vertical direction, for an electric arc that is a basic point to generate light by electric discharging, a convex arc is known to be drawn on a side opposite the force of gravity. In this case, the temperature of the bulb is higher on the upper side than on the lower side in the vertical direction. To maintain the life of the bulb, it is particularly advisable to keep the temperature of the bulb within a desired range, and improvement of the cooling accuracy of the bulb is important. Unless the temperature of the bulb is kept within the desired range, clouding or blackening may occur to shorten the life of the bulb, consequently causing luminance reduction or emission abnormality such as flickering.

When the entire bulb is uniformly cooled, a temperature difference of about 100 to 150° C. may be generated between the upper side and the lower side of the bulb in the vertical direction. Thus, when the upper side of the bulb in the vertical direction is cooled to an optimal temperature, the lower side of the bulb in the vertical direction is excessively cooled. When the lower side of the bulb in the vertical direction is cooled to an optimal temperature, the upper side of the bulb in the vertical direction is insufficiently cooled.

The light source device such as the projector may be located above an installation surface (floor installation) or below the installation surface (suspension installation). In such a light source device, in both cases of the floor installation and the suspension installation, it is advisable to efficiently cool the upper side of the bulb in the vertical direction.

JP2002-298639A (hereinafter, referred to as Patent Literature 1) and JP2006-243635A (hereinafter, referred to as Patent Literature 2) disclose light source devices that can cool the upper sides of the bulbs more intensively than the lower sides even when upside down.

The light source devices described in Patent Literature 1 and Patent Literature 2 include ducts for guiding cooling air to cool the bulbs. A wind direction control plate is disposed in the duct. The wind direction control plate changes the direction of the cooling air to cool the bulb. Accordingly, even when the light source device is upside down, the strong cooling air can be supplied to the upper side of the bulb in the vertical direction.

In the light source device described in Patent Literature 1, the cooling air out of the duct is jetted out in a direction having an angle with respect to the inner surface of the reflector, and bent toward the bulb in the inner surface of the reflector. The cooling air is dispersed when its traveling direction is curved. As a result, the cooling efficiency of the bulb may be reduced.

In the light source device described in Patent Literature 2, a cooling air guide is disposed in the jetting-out port of the duct. By this cooling air duct, the traveling direction of the cooling air jetted out from the duct is bent toward the bulb by about 90°. As a result, since the traveling direction of gas jetted out from the duct is greatly bent, the flow of gas may be dispersed to cause a reduction of cooling efficiency.

In particular, when the flow of gas to cool the upper side of the bulb in the vertical direction is dispersed to cause reduction of the cooling efficiency, the temperature of the upper side of the bulb may become excessively high.

In the light source device described in Patent Literature 2, the duct for guiding the cooling air is bent by about 90° near the inlet. When this structure becomes complex, a problem of the enlarged duct may occur.

CITATION

Patent Literature

Patent Literature 1: JP2002-29639A
Patent Literature 2: JP2006-243635A

SUMMARY

It is therefore an object of the present invention to provide a projection-type display device that can solve at least one of the problems.

According to an aspect of the present invention, a light source device includes a luminous tube, a reflector, and an air blowing device. The luminous tube includes a pair of electrodes arranged to face each other by sandwiching a surface vertical to the installation surface of the light source device and generate light by electric discharging, and a bulb for sealing the pair of electrodes. The reflector, which includes a reflection surface for reflecting light from the bulb and is formed into a concave surface shape to emit the light from the bulb, houses the luminous tube so that the bulb can be located in the center of the reflection surface. The air blowing device generates a flow of gas to cool the luminous tube. The light source device further includes: a first flow path for jetting out gas along the inner surface of the reflector to a first hemispherical part located far from the installation surface of the bulb; a second flow path for jetting out gas along the inner surface of the reflector to a second hemispherical part located near the installation surface of the bulb; and a movable plate for separating the first flow path and the second flow path from each other to form a part of each flow path, adjusts the amount of gas flowing into each flow path to adjust the ratio of an air flow in each flow path, and gradually narrows a flow path area in the flow path adjusted to increase the air flow in the gas jetting-out direction.

According to another aspect of the present invention, a projection-type display device includes the light source device.

According to the light source device thus configured, in whichever side the light source device is located, above or below the installation surface, the gas can efficiently be sprayed to the upper side of the bulb in the vertical direction.

The above and other objects, features and advantages of the present invention will become apparent from the following description with reference to the accompanying drawings which illustrate examples of the present invention.

REFERENCE SIGNS LIST

10 Light source device
12 Air blowing device
14 Lamp holder
16 Optical engine
18 Projection lens
20 Lamp unit
22 Luminous tube
23 Bulb
24 Sealing part
26, 27 Conductor
28 Conductive wire
29 Pair of electrodes
30 Reflector
34 Outlet
38 Duct structure
40 First flow path
42 Jetting-out port of first flow path
46 Fixed wall
47 First hemispherical part of bulb
48 Second hemispherical part of bulb
50 Second flow path
52 Jetting-out port of second flow path
56 Fixed wall
58 Separation wall
60 Third flow path
62 Jetting-out port of third flow path
66 First section
68 Second section
70 Fourth flow path
72 Jetting-out port of fourth flow path
80 Fifth flow path
82 Jetting-out port of fifth flow path
90 Movable plate
92 Rotary shaft
94 Stopper
96 Installation surface

DESCRIPTION OF EMBODIMENTS

Hereinafter, an embodiment of the present invention is described referring to the drawings. In the embodiment, a projection-type display device that includes a light source device is described in detail. However, not limited to the embodiment, the present invention can be applied to a general light source device that includes an air blowing device for generating a of gas to cool a luminous tube.

Figure 1:
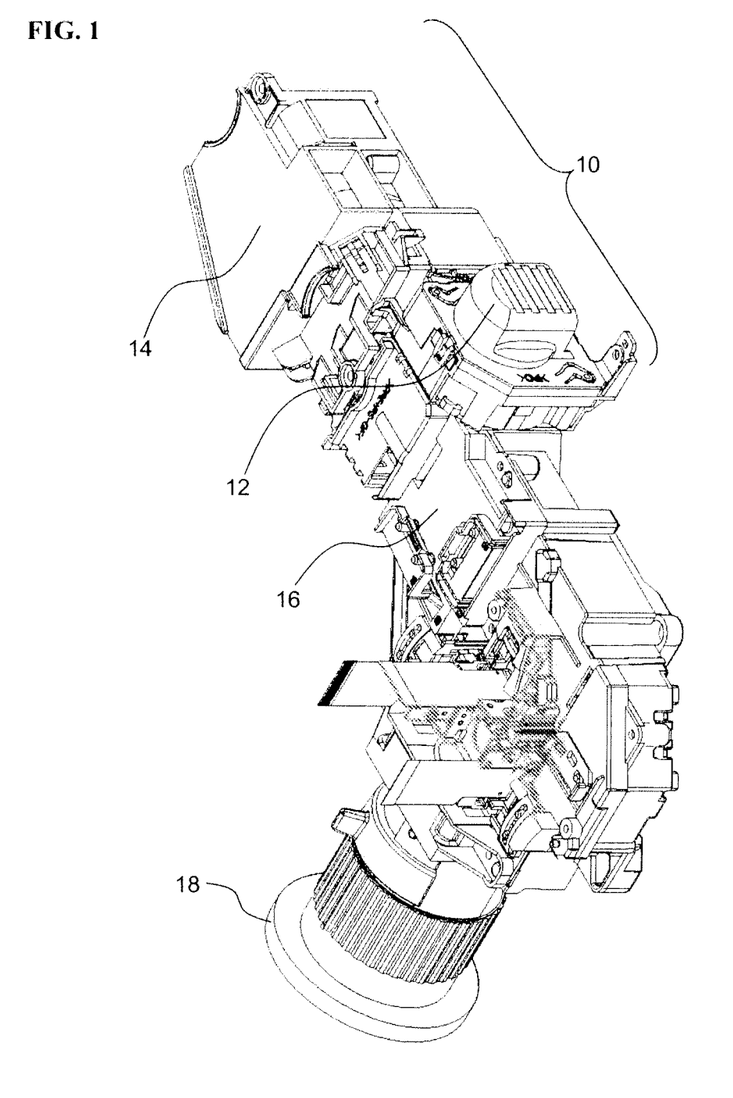
FIG. 1 is a perspective view schematically showing an example of a whole image including a projection-type display device according to an embodiment.

FIG. 1 shows the configuration of the main section of the projection-type display device according to the embodiment of the present invention. However, for convenience, FIG. 1 does not show the lamp unit of light source device 10. The projection-type display device includes light source device 10, optical engine 16, and projection lens 18. Light source device 10 according to the embodiment of the present invention includes the lamp unit (not shown), lamp holder 14 for holding the lamp unit, and air blowing device 12. Light source device 10 is located in an installation surface such as a floor or a ceiling.

Light emitted from the lamp unit of light source device 10 is subjected to optical processing by an optical component in optical engine 16, and then projected from projection lens 18 to the outside of the device. According to this embodiment, the light projected from projection lens 18 is bent by approximately 90° from the direction of the light emitted from the lamp unit. The lamp unit is cooled by gas (refrigerant gas) such as air blown from air blowing device 12.

Figure 2:
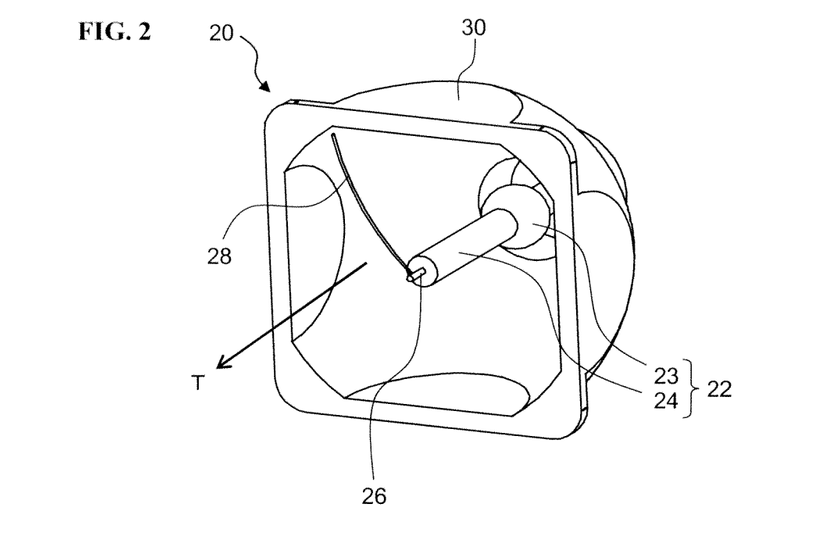
FIG. 2 is a perspective view schematically showing a lamp unit included in a light source device shown in FIG. 1.
Figure 3:
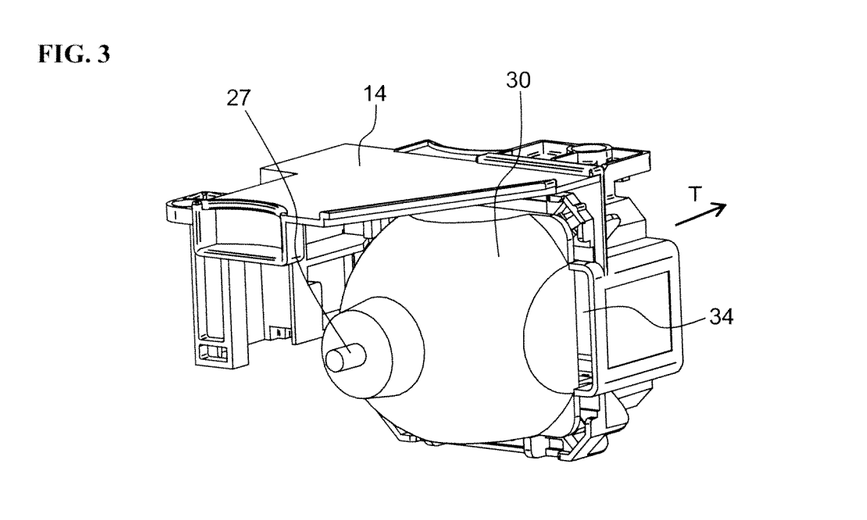
FIG. 3 is a perspective view schematically showing the lamp unit fixed to a lamp holder.

FIG. 2 is a perspective view schematically showing the lamp unit. FIG. 3 is a perspective view schematically showing the lamp unit fixed to lamp holder 14. Lamp unit 20 includes luminous tube 22 and reflector 30. For luminous tube 22, for example, an extra high pressure mercury lamp can be used.

Luminous tube 22 includes bulb 23 and sealing part 24. Bulb 23, which is roughly formed into a spherical shape, seals a pair of electrodes (also refer to reference number 29 shown in FIG. 9) that generates light by electric discharging. The pair of electrodes face each other by sandwiching a surface vertical to the installation surface of the light source device. Sealing part 24 extends in a rod shape from bulb 23 to both sides. In FIG. 2, only one sealing part 24 is shown. The other sealing part is not shown because it extends toward the rear side of reflector 30.

Sealing part 24 seals conductors 26 and 27 that supply power to the pair of electrodes 29 arranged in bulb 23. Luminous tube 22 including bulb 23 and sealing part 24 is made of, for example, a glass tube, and airtightly seals conductors 26 and 27 are made of metals. The leading ends of conductors 26 and 27, which project from both leading ends of luminous tube 22, supply power to the pair of electrodes 29 in bulb 23 from the outside. The leading end of conductor 26 is connected to conductive wire 28.

Luminous tube 22 is held in reflector 30 by, for example, an adhesive mainly containing an inorganic material. Reflector 30, which includes a reflection surface for reflecting the light from bulb 23, is formed into a concave shape to emit the light from bulb 23. Reflector 30 houses luminous tube 22 so that bulb 23 can be located in the center of the reflection surface. The light reflected by the reflection surface of reflector 30 is roughly emitted in one direction T. One sealing part 24 of luminous tube 22 extends in direction T where the light reflected by reflector 30 is emitted.

As an example, luminous tube 22 has a total length of 50 millimeters, and bulb 23 is located almost in the center. At one end of luminous tube 22, namely, within the range of 50 millimeters from the leading end of sealing part 24, a connection part between conductor 26 and conductive wire 28 (hereinafter, referred to as a metal coupling part) and a part for airtightly sealing the luminous tube (hereinafter, referred to as airtight sealing part) are located.

When light source device 10 is located above or below the installation surface (floor installation or suspension installation), the pair of electrodes 29 in bulb 23 face each other. In this case, in bulb 23, for an electric arc that is a basic point for emitting light by electric discharging, a convex arc is drawn on a side opposite the force of gravity. Thus, the temperature of bulb 23 is known to be higher on the upper side than on the lower side in the vertical direction. When the temperature of bulb 23 is higher than a predetermined temperature range, clouding occurs in bulb 23 to shorten the life of luminous tube 22. When the temperature of bulb 23 is lower than the predetermined temperature range, luminance reduction or emission abnormality such as flickering occurs to blacken bulb 23, consequently shortening the life of luminous tube 22.

Further, when the temperature of the airtight sealing part or the metal coupling part located at the leading end of luminous tube 22 is higher than an optimal temperature, the airtight sealing part or the metal coupling part may be deformed or cut.

The optimal temperature of bulb 23 located near the center of luminous tube 22 is about 900° C., and the optimal temperatures of the airtight sealing part and the metal coupling part located near the leading end of luminous tube 22 are 300 to 350° C. or less. Accordingly, it is preferred that bulb 23 and the leading end of luminous tube 22 be cooled at different strengths.

Figure 4:
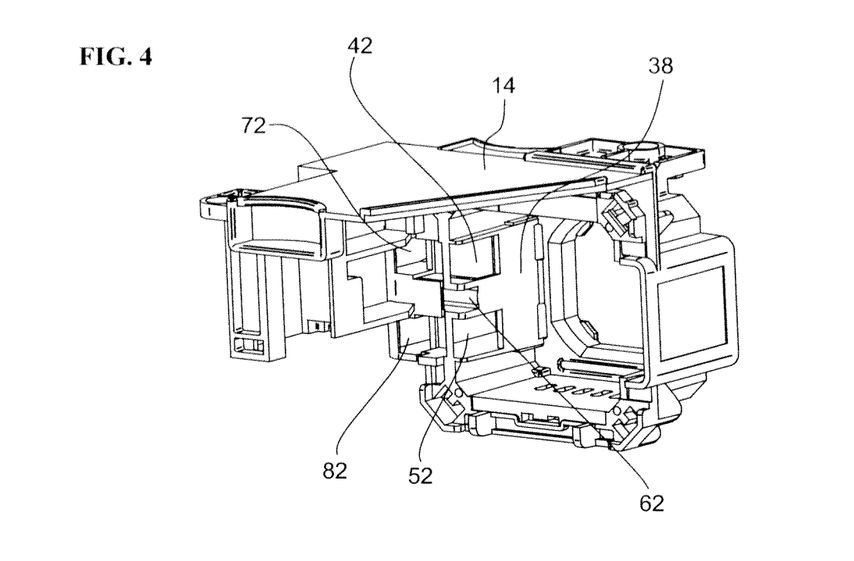
FIG. 4 is a perspective view schematically showing a configuration around the lamp holder.
Figure 5:
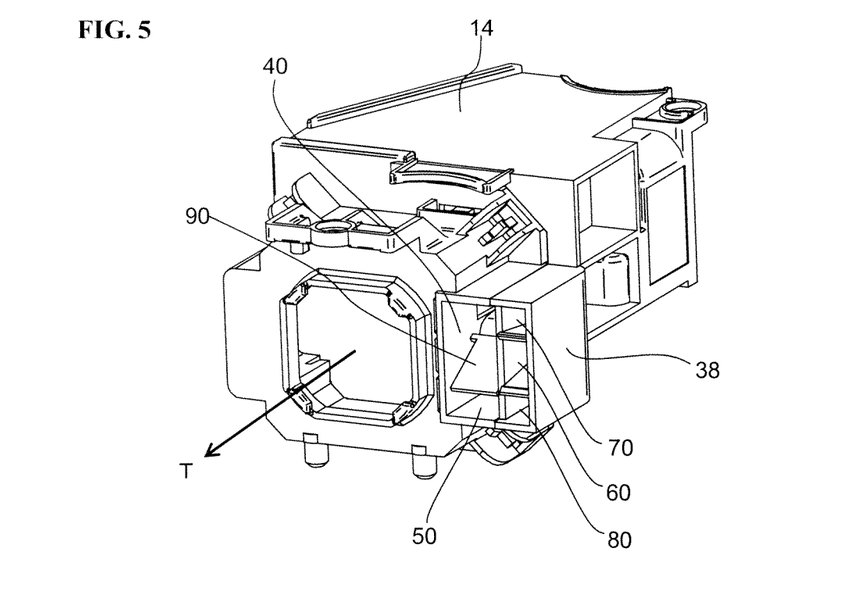
FIG. 5 is a perspective view schematically showing the configuration around the lamp holder when seen from a side opposite that shown in FIG. 4.
Figure 6:
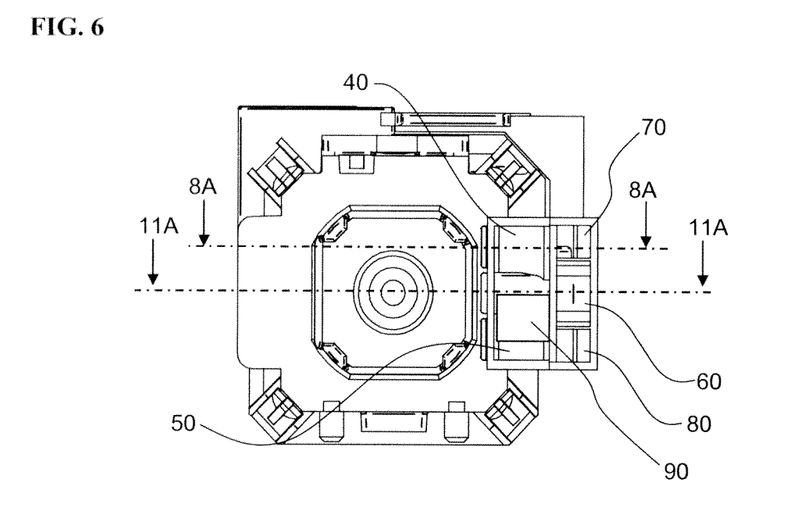
FIG. 6 is a plan view schematically showing the configuration around the lamp holder when seen from the emitting direction of light reflected by a reflector.

FIG. 4 is a perspective view schematically showing a configuration around the lamp holder. FIG. 5 is a perspective view schematically showing the configuration around the lamp holder when seen from a side opposite that shown in FIG. 4. FIG. 6 is a plan view schematically showing the configuration around the lamp holder when seen from emitting direction T of light reflected by reflector 30. Air blowing device 12 generates a flow of gas to cool luminous tube 22. Light source device 10 includes duct structure 38 for guiding the gas from air blowing device 12 to luminous tube 22. Air blowing device 12 is located on the downstream side of duct structure 38 in emitting direction T of the light reflected by the reflector. Duct structure 38 is located adjacently to lamp holder 14, and in a position not blocking the light from bulb 23.

In duct structure 38, at least first flow path 40 and second flow path 50 used for jetting out gas to mainly cool bulb 23 of luminous tube 22 are formed. Further, in duct structure 38, it is advisable to form third flow path 60 for jetting out gas to cool the metal coupling part and the airtight sealing part located at one leading end of luminous tube 22. It is further advisable to form, in duct structure 38, fourth flow path 70 and fifth flow path 80 for jetting out gas along the outer surface of reflector 30 to the rear side of reflector 30.

The gas from air blowing device 12 passes through one of flow paths 40, 50, and 60 to reach one part of luminous tube 22. Then, the gas is discharged through outlet 34 to the outside of light source device 10.

Figure 7:
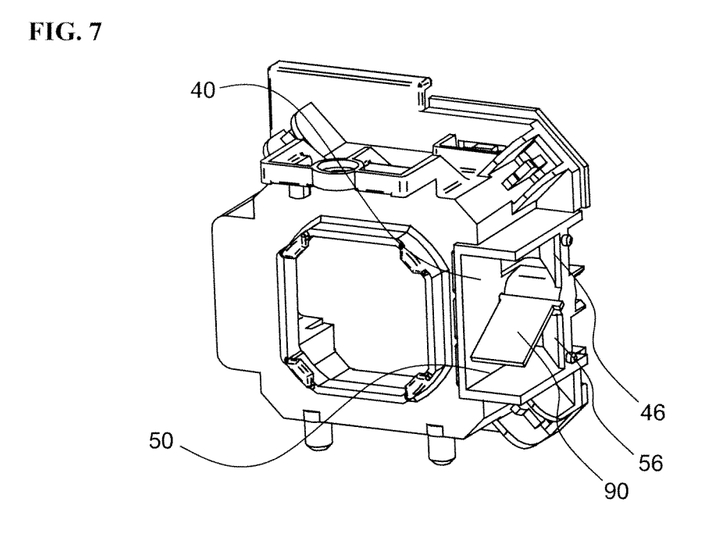
FIG. 7 is a perspective view schematically showing a part of a duct structure.

FIG. 7 is a perspective view schematically showing a part of duct structure 38. FIG. 7 shows only first flow path 40 and second flow path 50 formed in duct structure 38.

Figure 8:
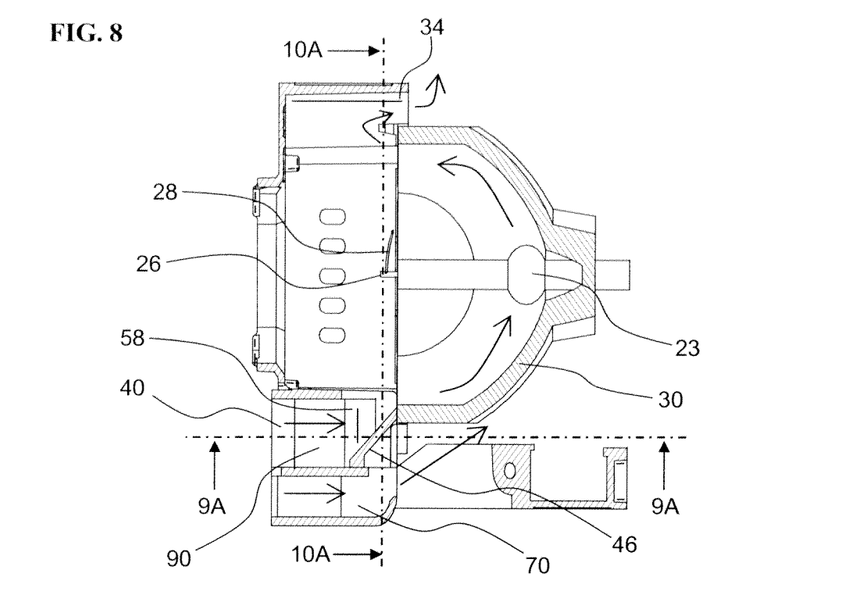
FIG. 8 is a schematic sectional view of the light source device cut along the line 8A-8A shown in FIG. 6.
Figure 9:
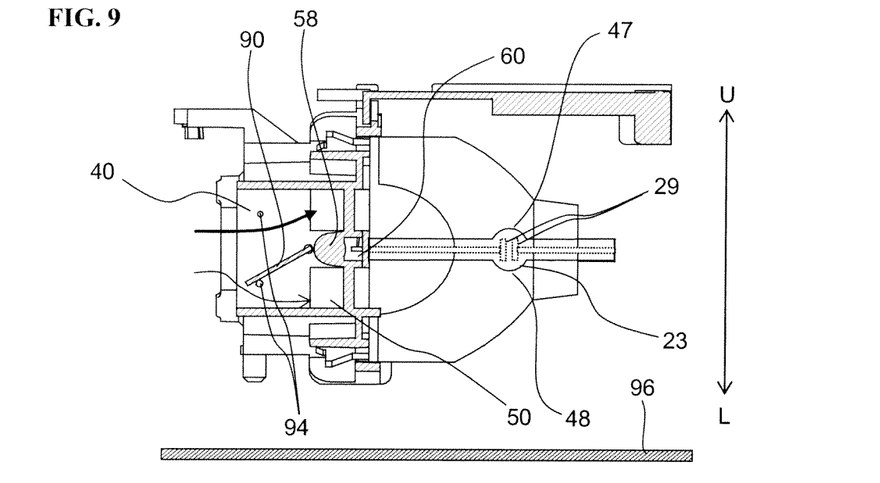
FIG. 9 is a schematic sectional view of the light source device cut along the line 9A-9A shown in FIG. 8.
Figure 10:
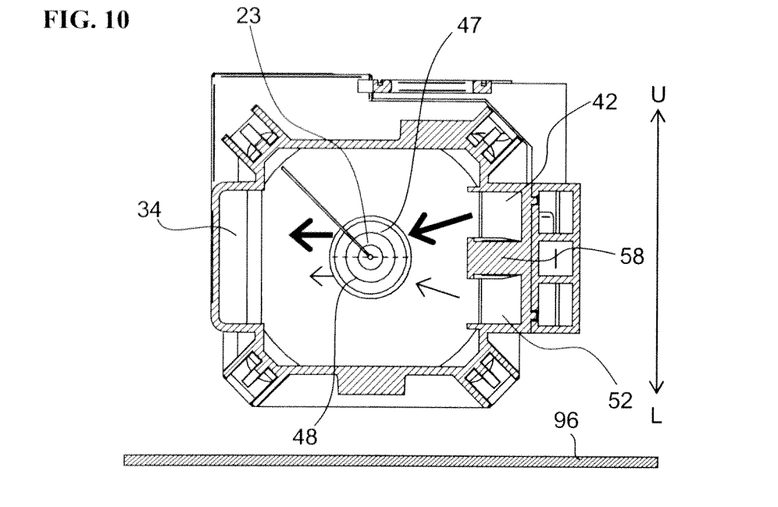
FIG. 10 is a schematic sectional view of the light source device cut along the line 10A-10A shown in FIG. 8.

FIG. 8 is a schematic sectional view of the light source device cut along the line 8A-8A shown in FIG. 6, showing the flow of gas jetted out from first flow path 40. FIG. 9 is a schematic sectional view of the light source device cut along the line 9A-9A shown in FIG. 8. FIG. 10 is a schematic sectional view of the light source device cut along the line 10A-10A shown in FIG. 8, showing the flow of gas jetted out from first flow path 40 and second flow path 50. These drawings show a case where light source device 10 is located above installation surface 96 parallel to a plane.

First flow path 40 is used for blowing the gas from air blowing device 12 along the inner surface of reflector 30 toward first hemispherical part 47 located far from installation surface 96. Second flow path 50 is used for blowing the gas from air blowing device 12 along the inner surface of reflector 30 toward second hemispherical part 48 located near installation surface 96.

Herein, "first hemispherical part 47" means a part of the bulb located on the upper side in the vertical direction when light source device 10 is set above installation surface 96. "Second hemispherical part 48" means a part of the bulb located on the lower side in the vertical direction when light source device 10 is set above installation surface 96. Accordingly, when light source device 10 is reversely located below installation surface 96, first hemispherical part 47 is located on the lower side in the vertical direction, and second hemispherical part 48 is located on the upper side in the vertical direction.

Light source device 10 includes movable plate 90 that separates first flow path 40 and second flow path 50 from each other to form parts of first and second flow paths 40 and 50. Movable plate 90 adjusts the amount of gas flowing into each of flow paths 40 and 50 to adjust the rate of an air flow in each of flow paths 40 and 50. Movable plate 90 gradually narrows the flow path area at flow path 40 or 50 adjusted to increase the air flow in a gas jetting-out direction.

In this exemplary embodiment, in the sections of first flow path 40 and second flow path 50 on the downstream side of movable plate 90, fixed walls 46 and 56 are respectively formed to narrow the flow path areas of respective flow paths 40 and 50 toward the downstream side.

The gas from air blowing device 12 is separated into gas to cool first hemispherical part 47 of the bulb and gas to cool second hemispherical part 48 by movable plate 90. The gas out of jetting-out port 42 of first flow path 40 is jetted out along the inner surface of reflector 30, and reaches first hemispherical part 47 of the bulb to cool first hemispherical part 47 of the bulb. The gas that has cooled first hemispherical part 47 of the bulb flows along the inner surface of reflector 30, and is discharged through outlet 34 formed on the side opposite jetting-out port 42 to the outside of light source device 10.

The flow of gas jetted out from outlet 52 of second flow path 50 is symmetrical to that of gas jetted out from first flow path 40 with respect to a plane passing through the center of luminous tube 22.

By movable plate 90, even when light source device 10 is in a floor installation state or conversely in a suspended state, the hemispherical part located on upper side U of the bulb in the vertical direction can be strongly cooled. In other words, the air flow in first flow path 40 can be increased when first hemispherical part 47 is located on the upper side in the vertical direction. The air flow in second flow path 50 can be increased when second hemispherical part 48 is located on the upper side in the vertical direction.

Movable plate 90 gradually narrows the flow path area in flow path 40 or 50 adjusted to increase the air flow in the gas flowing direction. Accordingly, most of the gas jetted out from the flow path adjusted to increase the air flow strongly flows straight. Further, the gas jetted out from the flow path adjusted to increase the air flow flows along the inner surface of reflector 30 by the shortest distance to bulb 23. Accordingly, stagnation of the gas flow is suppressed, and losses in the gas flow are reduced. Particular, by increasing the air flow of the gas jetted out to the hemispherical part located on the upper side of bulb 23 in the vertical direction, the hemispherical part on the upper side of bulb 23 in the vertical direction can be efficiently cooled. Thus, by cooling entire bulb 23 to the optimal temperature, shortening of the life cycle or emission abnormality of bulb 23 can be prevented.

Specifically, duct structure 38 includes partition wall 58 to partition the gas from air blowing device 12 between first flow path 40 and second flow path 50 (also refer to FIGS. 5 and 6). Movable plate 90 extends from separation wall 58 to the upstream side of the gas flow. Movable plate 90 and separation wall 58 roughly extend in the gas jetting-out direction. Accordingly, first flow path 40 and second flow path 50 extend in the gas jetting-out direction.

As described above, it is preferred that the vicinity of the jetting-out port of flow path 40 or 50 having the large air flow extend in the gas jetting-out direction and the flow path area be reduced toward the downstream side of the flow jetting-out direction. This suppresses gas dispersion more to reduce loss in the gas flow.

In this embodiment, movable plate 90 is configured to be rotatable around rotary shaft 92. Rotary shaft 92 is configured to be substantially parallel to installation surface 96 when light source device 10 is located on level installation surface 96. Movable plate 90 rotates around rotary shaft 92 by the force of gravity. Thus, in whichever floor installation state and the suspension installation state that the light source device is set, movable plate 90 rotates to increase the air flow of the gas that passed through flow path 40 or 50 for jetting out the gas toward the hemispherical part of the upper side of bulb 23 in the vertical direction.

FIGS. 9 and 10 show a case where light source device 10 is located above installation surface 96. When light source device 10 is located below installation surface 96, movable plate 90 increases the air flow of the gas that passed through second flow path 50. This enables effective cooling of bulb 23 even when second hemispherical part 48 is located on upper side U in the vertical direction.

In this embodiment, the rotational range of movable plate 90 is adjusted by stopper 94, and the gas partly flows to the other flow path (second flow path 50 in the case shown in FIG. 9). Accordingly, the distribution of the air flow of the gas that passed through first flow path 40 and the air flow of the gas that passed through second flow path 50 can be adjusted. As a result, the temperature difference generated in bulb 23 can be reduced to cool entire bulb 23 to the optimal temperature.

In this embodiment, the traveling direction of the gas from air blowing device 12 is not bent on the upstream side of movable plate 90 in first flow path 40 and second flow path 50. This provides an advantage of an easier operation of movable plate 90 because the increase of pressure in the flow path is suppressed.

Figure 11:
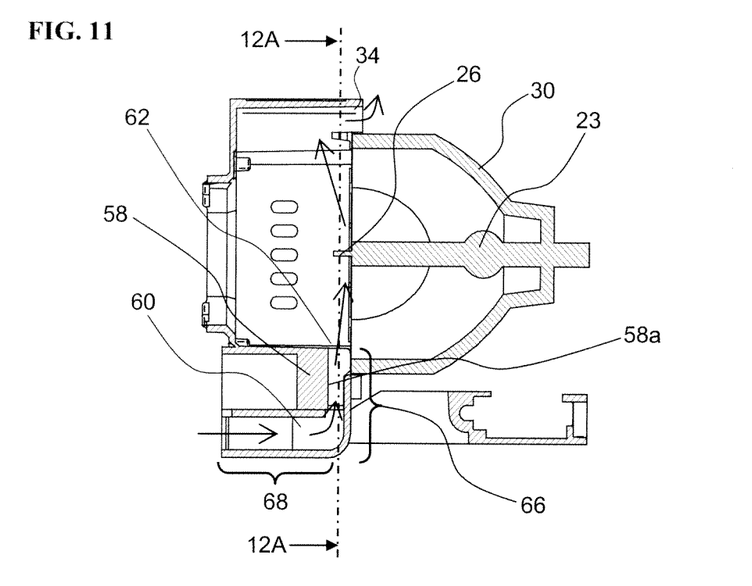
FIG. 11 is a schematic sectional view of the light source device cut along the line 11A-11A shown in FIG. 6.
Figure 12:
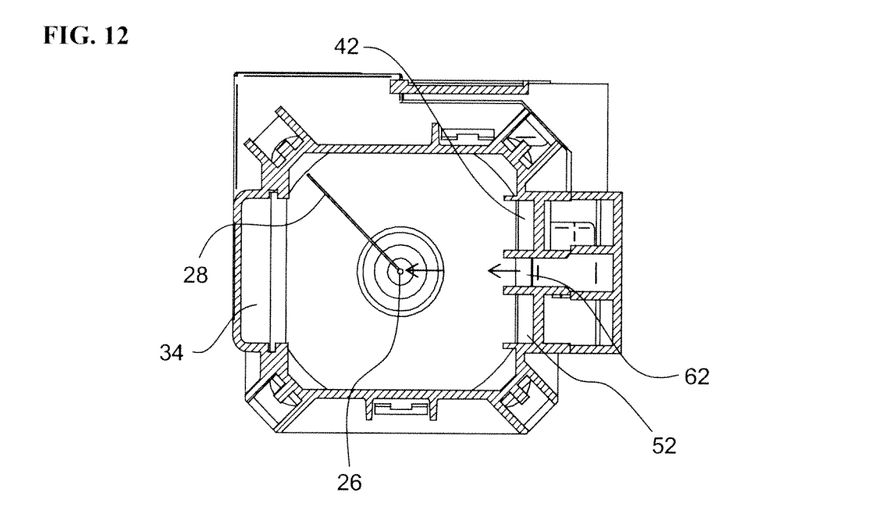
FIG. 12 is a schematic sectional view of the light source device cut along the line 12A-12A shown in FIG. 11.

FIG. 11 is a schematic sectional view of the light source device cut along the line 11A-11A shown in FIG. 6, showing the configuration of third flow path 60. FIG. 12 is a schematic sectional view of the light source device cut along the line 12A-12A shown in FIG. 11, showing the flow of gas jetted out from jetting-out port 62 of third flow path 60. It is advisable to locate jetting-out port 62 of third flow path 60 between jetting-out port 42 of the first flow path and jetting-out port 52 of the second flow path. Third flow path 60, which is located on the rear side of separation wall 58 for separating first flow path 40 and second flow path 50 from each other, includes first section 66 extending across first flow path 40 and second flow path 50. Rear surface 58a of the separation wall forms at least a part of third flow path 60. This simplifies the configuration of duct structure 38 to enable reduction of light source device 10 in size and weight.

More specifically, third flow path 60 includes first section 66 of the downstream side extending across first flow path 40 and second flow path 50, and second section 68 of the upstream side connected to first section 66 and extending along first flow path 40 and second flow path 50. Accordingly, gas flows into third flow path 60 from a device similar to air blowing device 12 that generates the flow of gas flowing into first and second flow paths 40 and 50.

Since first section 66 of third flow path 60 extends across first flow path 40 and second flow path 50 in the gas jetting-out direction, the dispersion of gas flow from third flow path 60 is suppressed. Thus, the use efficiency of gas flow through third flow path 60 is increased, and the leading end of luminous tube 22 can be efficiently cooled.

Most of the gas jetted out from third flow path 60 is blown to one leading end of luminous tube 22 and the vicinity of conductor 26. Accordingly, the airtight sealing part or the welded part located at one leading end of luminous tube 22 is cooled. The gas that has cooled the leading end of luminous tube 22 is discharged from outlet 34 to the outside of light source device 10.

Gas jetted out from jetting-out ports 72 and 82 of fourth flow path 70 and fifth flow path 80 adjacent to first flow path 40 and second flow path 50 flows along the outer surface (rear surface) of reflector 30 to cool a cable or a connector (not shown) located on the rear surface of reflector 30 (refer to FIG. 8). This gas also cools a metal component or a plastic component disposed around reflector 30.

In this embodiment, fourth and fifth flow paths 70 and 80 are arranged on both sides sandwiching second section 68 of third flow path 68. Fourth and fifth flow paths 70 and 80 are located further to the outside than first and second flow paths 40 and 50 with respect to luminous tube 22.

Figure 13:
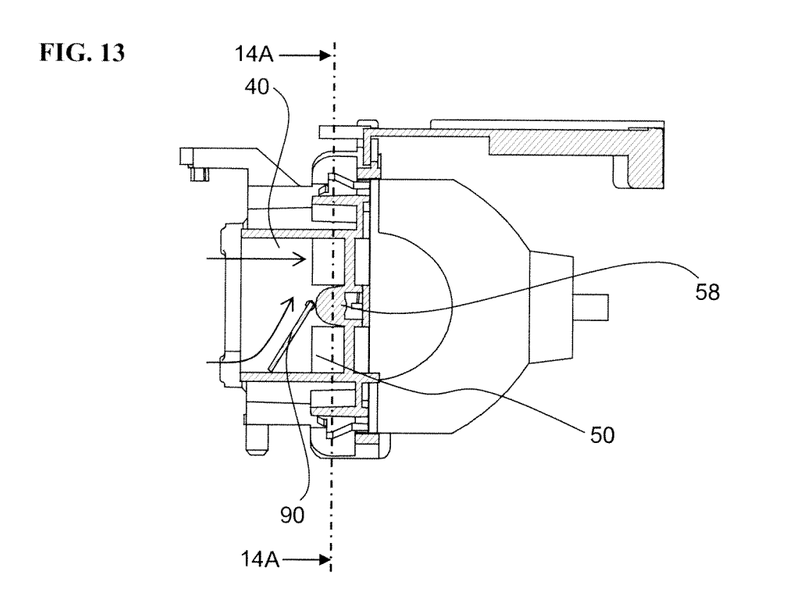
FIG. 13 is a sectional view schematically showing another example of a movable plate and a configuration around it.
Figure 14:
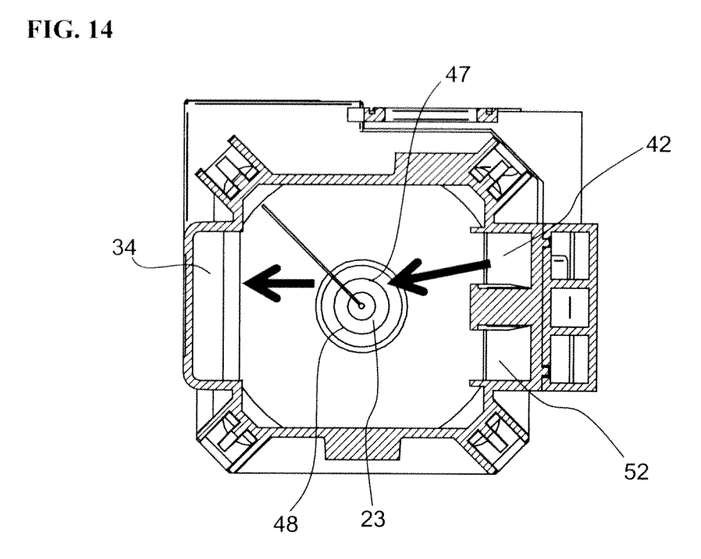
FIG. 14 is a schematic sectional view of the light source device cut along the line 14A-14A shown in FIG. 13.

FIG. 13 is a sectional view schematically showing another example of movable plate 90 and the configuration around it. FIG. 14 is a schematic sectional view of the light source device cut along the line 14A-14A shown in FIG. 13.

In the example shown in FIGS. 13 and 14, movable plate 90 rotates until it comes into contact with the inner wall of first flow path 40 or second flow path 50. The other components of light source device 10 are similar to those of the aforementioned example, and thus description thereof is omitted. When movable plate 90 comes into contact with the inner wall of flow path 40 or 50, the gas only flows into first flow path 40 or into second flow path 50, and the other flow path is closed. Unless it is necessary to cool the hemispherical part in the lower side of bulb 23 in the vertical direction, the light source device of this example is sufficient. When gas flows into both first flow path 40 and second flow path 50, the hemispherical part in the lower side of bulb 23 in the vertical direction may be excessively cooled. In such a case, the light source device of this example is useful.

The preferred embodiments of the present invention have been described in detail. However, various changes and modifications can be made without departing from the gist and the scope of the present invention specified in the appended claims.

The invention claimed is:

1. A light source device comprising:
   a luminous tube including a pair of electrodes for generating light by electric discharging and a bulb for sealing the pair of electrodes, the pair of electrodes arranged to face each other;
   a reflector that includes a reflection surface for reflecting light emitted from the bulb, the reflection surface formed into a concave surface shape to reflect the light emitted from the bulb, the reflector housing the luminous tube so that the bulb can be located in a center of the reflection surface;

an air blowing device for generating a flow of gas to cool the luminous tube;

a first flow path for jetting out the gas along an inner surface of the reflector toward a first half part located far from the installation surface of the bulb;

a second flow path for jetting out the gas along the inner surface of the reflector toward a second half part located near the installation surface of the bulb; and a movable plate for separating the first flow path and the second flow path from each other to form a part of each flow path, the movable plate adjusting an amount of gas flowing into each flow path to adjust a ratio of an air flow in each flow path, the movable plate gradually narrowing a flow path area in the flow path adjusted to increase the air flow in a jetting-out direction of the gas, wherein the luminous tube includes a sealing part that seals a conductor for supplying power to the pair of electrodes and that extends in an emitting direction of the light reflected by the reflector;

the light source device further comprises a third flow path for jetting out the gas that flowed from the air blowing device toward a leading end of the sealing part in the emitting direction of the light; and the third flow path is partially formed by a separation wall for separating the first flow path and the second flow path from each other.

2. The light source device according to claim 1, wherein the third flow path includes a first downstream section that extends across the first flow path and the second flow path, and a second upstream section that connects to the first downstream section and extends along the first flow path and the second flow path from an inlet of the gas that flowed from the air blowing device.

3. The light source device according to claim 1, further comprising another flow path for jetting out the gas that flowed from the air blowing device along an outer surface of the reflector toward a rear side of the reflector.

4. A projection-type display device comprising:

the light source device according to claim 1.

5. The light source device according to claim 1, further comprising a first fixed wall and a second fixed wall, the first fixed wall provided between the movable plate and a first jetting-out port of the first flow path, the first fixed wall formed to narrow a flow path area of the first flow path toward the first jetting-out port, the second fixed wall provided between the movable plate and a second jetting-out port of the second flow path, the second fixed wall formed to narrow a flow path area of the second flow path toward the second jetting-out port.

* * * * *